United States Patent
Schillings et al.

(10) Patent No.: US 11,203,545 B2
(45) Date of Patent: Dec. 21, 2021

(54) DEVICE AND METHOD FOR PRESS BENDING GLASS PANES

(71) Applicant: SAINT-GOBAIN GLASS FRANCE, Courbevoie (FR)

(72) Inventors: Peter Schillings, Eschweiler (DE); Arnaud Borderiou, Compiegne (FR); Arthur Palmantier, Aachen (DE); Achim Zeichner, Herzogenrath (DE)

(73) Assignee: SAINT-GOBAIN GLASS FRANCE., Courbevoie (FR)

( * ) Notice: Subject to any disclaimer, the term of this patent is extended or adjusted under 35 U.S.C. 154(b) by 190 days.

(21) Appl. No.: 16/604,026

(22) PCT Filed: Mar. 15, 2018

(86) PCT No.: PCT/EP2018/056471
§ 371 (c)(1),
(2) Date: Oct. 9, 2019

(87) PCT Pub. No.: WO2018/188888
PCT Pub. Date: Oct. 18, 2018

(65) Prior Publication Data
US 2020/0148574 A1    May 14, 2020

(30) Foreign Application Priority Data
Apr. 10, 2017  (EP) .................................. 17165667

(51) Int. Cl.
C03B 23/03   (2006.01)
C03B 23/025  (2006.01)
C03B 27/00   (2006.01)

(52) U.S. Cl.
CPC .......... *C03B 23/03* (2013.01); *C03B 23/0252* (2013.01); *C03B 27/00* (2013.01)

(58) Field of Classification Search
None
See application file for complete search history.

(56) References Cited

U.S. PATENT DOCUMENTS 4,979,977 A    12/1990  Frank et al.
5,669,952 A *  9/1997  Claassen ............. C03B 23/0252
                                                 65/106
(Continued)

FOREIGN PATENT DOCUMENTS

CN   1187174 A   7/1998
CN   1768011 A   5/2006
(Continued)

OTHER PUBLICATIONS

Le Corre et al. Glass sagging simulation with improved calculation of radiative heat transfer by the optimized reciprocity Monte Carlo method. International Journal of Heat and Mass Transfer 70 (2014) 215-223. (Year: 2014).*
(Continued)

*Primary Examiner* — Erin Snelting
(74) *Attorney, Agent, or Firm* — Pillsbury Winthrop Shaw Pittman LLP

(57) ABSTRACT

A device for bending glass panes, includes a lower press-bending mould with a frame-shaped contact surface, an upper press-bending mould arranged opposite the contact surface, wherein the lower press-bending mould and the upper press-bending mould are suitable for reshaping a glass pane situated therebetween by pressing, wherein the side edge of the glass pane rests on the contact surface along a contact line, wherein during pressing, the contact line migrates from a first contact line all the way to a pressing line, and wherein the contact surface between the first contact line and the pressing line is convexly curved.

20 Claims, 4 Drawing Sheets

(56) References Cited

U.S. PATENT DOCUMENTS

Figure 3:
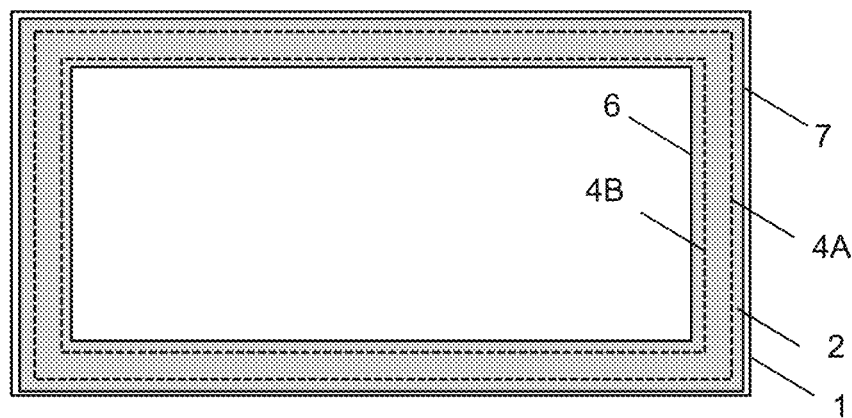

| | | | |
|---|---|---|---|
| 5,882,370 A | | 3/1999 | Garner et al. |
| 6,629,436 B1 * | | 10/2003 | Skeen ................ C03B 23/027 65/102 |
| 2005/0268661 A1 | | 12/2005 | Yoshizawa et al. |
| 2007/0039354 A1 | | 2/2007 | Ollfisch et al. |
| 2010/0236290 A1 * | | 9/2010 | Fukami ................ C03B 23/027 65/106 |

FOREIGN PATENT DOCUMENTS

| | | | | |
|---|---|---|---|---|
| DE | 10314267 B3 | 8/2004 | | |
| EP | 0677488 A2 | 10/1995 | | |
| EP | 2 365 945 A1 | 9/2011 | | |
| JP | 08295522 A | * 11/1996 | ......... | C03B 23/0307 |
| JP | 2000-327354 A | 11/2000 | | |
| JP | 2006-521272 A | 9/2006 | | |
| JP | 2006-521273 A | 9/2006 | | |
| JP | 2014-051417 A | 3/2014 | | |
| KR | 10-2005-0109611 A | 11/2005 | | |
| RU | 2255908 C2 | 7/2005 | | |
| RU | 2548416 C1 | 4/2015 | | |
| SU | 772974 A1 | 10/1980 | | |
| SU | 941323 A1 | 7/1982 | | |
| WO | WO 97/07066 A1 | 2/1997 | | |
| WO | WO 2002/030838 A1 | 4/2002 | | |
| WO | WO 2007/125973 A1 | 11/2007 | | |
| WO | WO 2010/065368 A1 | 6/2010 | | |

OTHER PUBLICATIONS

First Office Action as issued in Chinese Patent Application No. 201880000591.9, dated Jul. 1, 2021.
International Search Report as issued in International Patent Application No. PCT/EP2018/056471, dated Jun. 19, 2018.

* cited by examiner

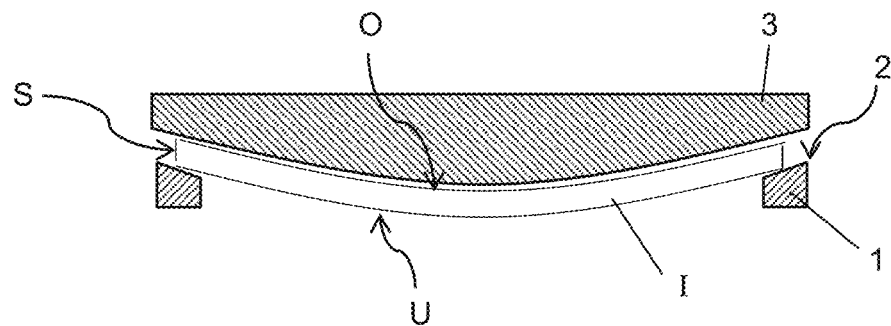
Fig. 1
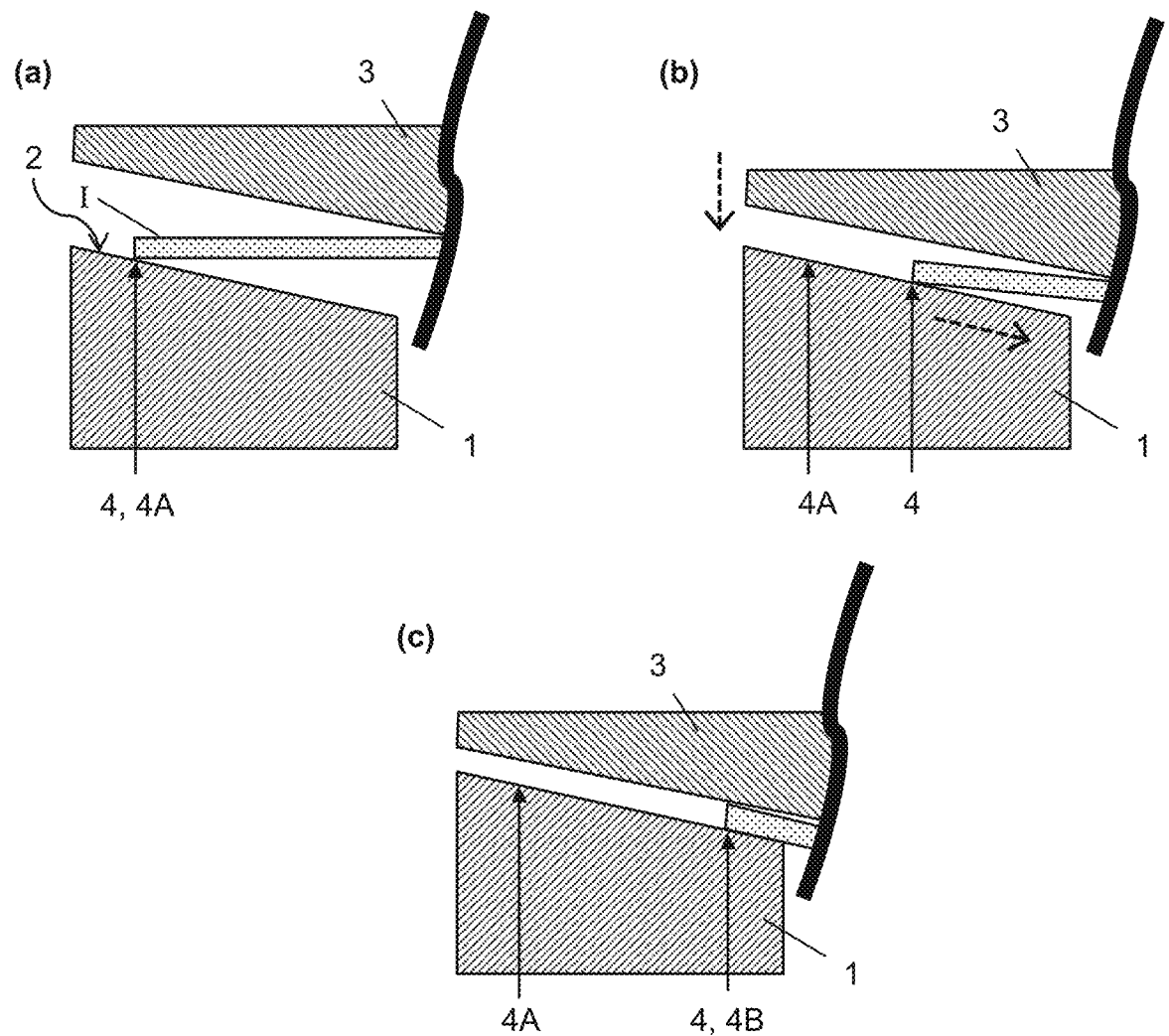
Fig. 2 – Prior Art

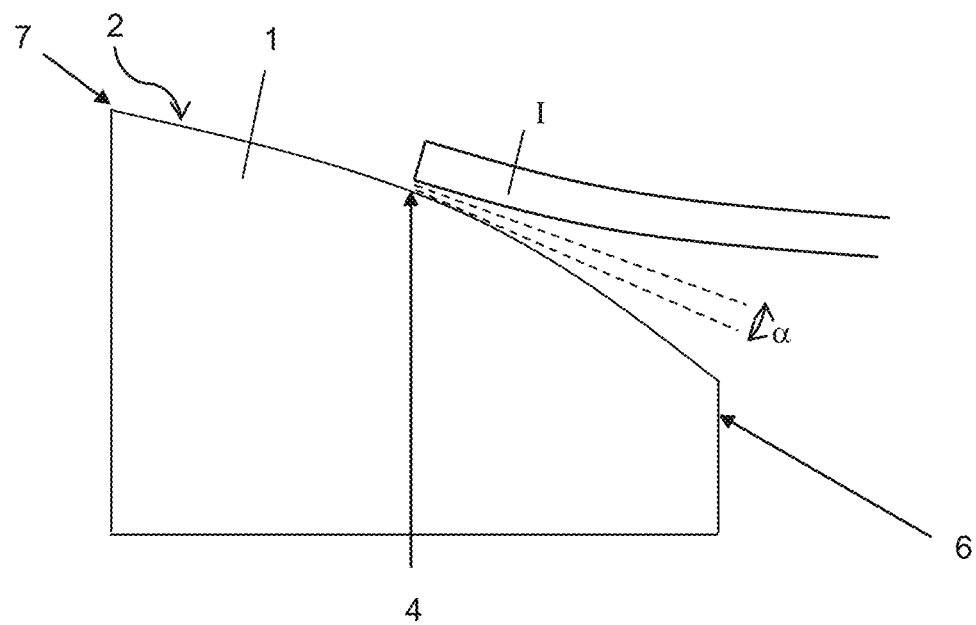
Fig. 5
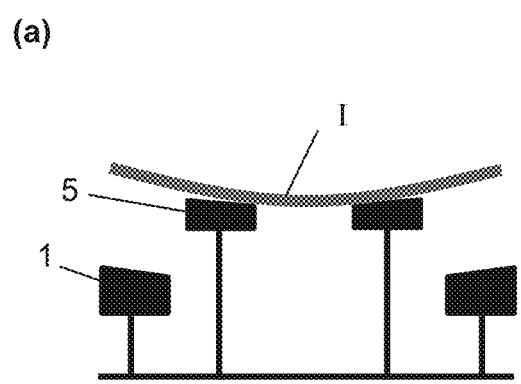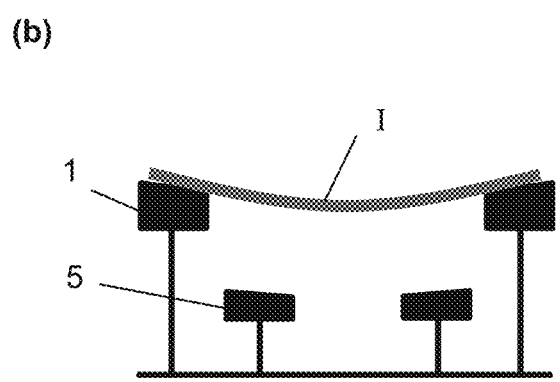
Fig. 6

DEVICE AND METHOD FOR PRESS BENDING GLASS PANES

CROSS-REFERENCE TO RELATED APPLICATIONS

This application is the U.S. National Stage of PCT/EP2018/0564171, filed. Mar. 15, 2018, which in turn claims priority to European patent application number 17165667.1 filed Apr. 10, 2017. The content of these applications are incorporated herein by reference in their entireties.

The invention relates to a device and a method for bending glass panes, in particular for press bending glass panes.

Glazings for motor vehicles typically have a bend. Various methods are known for producing such a bend. In so-called "gravity bending" (also known as sag bending), the glass pane, planar in the initial state, is arranged on the support surface of a bending mould and heated to at least its softening temperature such that it rests on the support surface under the influence of gravity. In the so-called "press-bending method", the pane is arranged between two complementary moulds, which, together, exert a pressing action on the pane in order to produce the bend.

Frequently used in press bending is a lower press-bending mould with a frame-like contact surface, on which only the side edge of the glass pane rests along a circumferential contact line. The contact surface is typically planar and inclined inward. This merely line-like contact between the glass pane and the contact surface is important in order to avoid mould markings and an associated reduction in optical quality. When the glass pane is pressed by the upper press-bending mould (often a so-called "solid mould" with a full-surface active surface) into the lower press-bending mould and reshaped, said contact line migrates on the contact surface from the outside to the inside as a result of the increasing bending of the pane. It is essential here for the line-like contact with the contact surface to be maintained during the entire operation and for the primary surface of the pane not to make contact with the lower press-bending mould. Press-bending methods of this type are described, for example, in DE10314267B3, WO2007125973A1, EP0677488A2, or WO9707066A1.

The problem exists with glass panes with strong curvatures in the edge region that the contact surface would have to be arranged very steeply in order to ensure the line-like contact. In order for the contact surface to nevertheless have sufficient overall width, it would have to be greatly extended, which would result in an unmanageably tall bending tool.

Also known are more complex bending tools, with which panes with strong curvatures can be produced. Thus, U.S. Pat. No. 5,882,370 A discloses a lower bending mould that is used both to produce a pre-bend using gravity bending and also as a lower press-bending mould and which has articulated edge regions. The edge regions are first positioned downward such that the bending mould is relatively flat when the planar pane is placed thereon and are pivoted upward with increasing pane curvature in order to gently realise a stronger curvature in the edge region. The tools are, however, very complex with joints and means for producing the pivoting movement, which increases production, maintenance intensity, and susceptibility to errors.

US2005268661A1 discloses a lower press-bending mould with a concavely curved contact surface.

The object of the present invention is to provide an improved device for press bending, with which strong pane curvatures can be realised in the edge region without more complex bending methods being necessary.

The object of the invention is accomplished according to the invention by a device for bending glass panes, comprising:
  a lower press-bending mould with a frame-shaped contact surface,
  an upper press-bending mould arranged opposite the contact surface,
  wherein the lower press-bending mould and the upper press-bending mould are suitable for reshaping a glass pane situated therebetween (heated to softening temperature) by pressing, wherein the side edge of the glass pane rests on the contact surface along a contact line, wherein the contact line migrates during pressing from a first contact line all the way to a pressing line (i.e., is displaced on the contact surface).

The object of the invention is also accomplished by a method for bending glass panes, comprising the following steps:
  (a) Arranging a glass pane heated to at least its softening temperature between a lower press-bending mould with a frame-shaped contact surface and an upper press-bending mould arranged opposite the contact surface and establishing contact between the side edge of the glass pane and the contact surface along a first contact line.
  (b) Press bending the glass pane (i.e., reshaping the glass pane by pressing) between the lower press-bending mould and the upper press bending mould, wherein the side edge of the glass pane always rests on the contact surface along a circumferential contact line, which migrates during pressing from the first contact line all the way to a pressing line.

The device and the method are presented together in the following, with the explanations and preferred embodiments referring equally to the device and the method.

According to the invention, the contact surface between the first contact line and the pressing line is convexly curved. The convex curvature of the contact surface is opposite the direction of curvature of the glass pane. The contact surface is thus, so to speak, bent away from the glass pane, which prevents the primary pane surface from coming into contact with the contact surface. Instead, the line-like contact along the side edge of the glass pane is ensured even with strong pane curvatures. Glass panes with strong curvature, in particular in the edge region, and high optical quality can be manufactured with the lower press-bending mould according to the invention. However, no complex adaptations of the bending devices and methods are required for this. The lower press-bending mould of existing devices merely has to be replaced by the one according to the invention. Thus, the invention can be easily integrated into existing plants and operations. These are major advantages of the present invention.

The device according to the invention comprises a lower and an upper press-bending mould. The press-bending moulds are arranged opposite one another and have complementary active surfaces or contact surfaces that are suitable for bending a glass pane heated to softening temperature into the desired shape, by pressing it between the press-bending moulds, with the curvature of the pane being changed. In the context of the invention "a lower bending mould" means a mould that contacts the lower, ground-facing surface of the glass pane or is associated therewith and acts thereon. The term "an upper bending mould" means a mould that contacts the upper surface of the glass pane that faces away from the ground or is associated therewith and acts thereon. The bending moulds can also be referred to as bending tools.

The lower press-bending mould has a contact surface that is frame-like. The term "contact surface" refers here to a substantially upward pointing surface facing away from the ground that is intended to support the glass pane during pressing. The contact surface is delimited by edges, and, specifically, by an outer edge and an inner edge, which run circumferentially in a frame-like manner in each case. The inner edge faces the center and, in the intended use, faces the center of the glass pane. The outer edge points outward and, in the intended use, faces away from the center of the glass pane. During the bending operation, it is not the entire surface that makes direct contact with the glass pane, but merely the region between the first support line and the pressing line. The contact surface is not a so-called "solid mould", i.e. not a solid bending mould that is intended to come into contact with most of the glass pane. Instead, the contact surface is frame-like or frame-shaped and adapts to the contour of the glass pane to be bent such that it is suitable for contacting the circumferential side edge of the glass pane. Such a bending mould can also be referred to as a ring (bending ring) or frame (frame mould). The lower surface of the glass pane has no direct contact with the contact surface, but merely its side edge. The contact surface need not necessarily form a complete frame, but can also be discontinuous. The contact surface is implemented in the form of a complete or discontinuous frame.

It is irrelevant whether the glass pane, before press bending, is brought into contact first with the lower or the upper press-bending mould. Thus, the glass pane can be placed on the lower press-bending mould and then can be brought closer to the upper press-bending mould. Alternatively, the glass pane can first be picked up by the upper press-bending mould, for example, by sucking or blowing action, and can subsequently be brought closer to the lower press-bending mould. In any case, only the side edge of the glass pane comes into contact with the contact surface of the lower press-bending mould. The direct contact between the glass pane and the contact surface is thus line-like or line-shaped, with this line referred to in the context of the invention as a "contact line". The contact line is implemented on the contact surface circumferentially like a frame. That contact line, along which the glass pane first touches the contact surface when the moulds are brought close to one another before the start of the reshaping is referred to in the context of the invention as the first contact line. As soon as the actual press bending begins and the pane is reshaped, the side edge of the glass pane is displaced on the contact surface. As a result of the increasing curvature of the glass pane, the contact line migrates inward, away from the outer boundary edge of the frame-like contact surface. When, upon completion of the press bending, after reaching the final pane shape, the bending moulds have reached their final position, the contact line has been maximally displaced and has reached its most inward position. In the context of the invention, this contact line is referred to as the "pressing line". The contact line migrates during the bending operation starting from the first contact line inward all the way to the pressing line.

The direct contact between the glass pane and the lower bending mould during the entire bending operation is always only in the form of a line along the contact line. The lower pane surface never comes into contact with the lower bending mould. Here, that primary surface of the glass pane that faces the bending mould and the ground is referred to as the "lower pane surface", whereas that primary surface of the glass pane that is turned away from the bending mould and points upward is referred to as the "upper pane surface".

The circumferential side edge extends between the upper and the lower pane surface. Precisely stated, the boundary line between the lower pane surface and the side edge is, in particular, in contact with the contact surface.

The contact surface of the lower press-bending mould has at least one section in which it is convexly curved at least in the region between the first contact line and the pressing line. The glass pane is pressed into the lower press-bending mould by the upper press-bending mould such that the center of the pane drops and the pane edges are raised relative to the center of the pane. The glass pane is thus bent such that the lower pane surface is convexly curved and the upper pane surface is concavely curved. The contact surface is convexly curved such that the curvature of the contact surface and the curvature of the glass pane are in the opposite direction from one another. The height of the contact surface decreases in the direction from the outer edge to the inner edge. The inner region of the contact surface is thus bent away from the glass pane, so to speak, such that the contact surface is prevented from touching the lower pane surface, even with strong pane curvatures.

The curvature according to the invention need not necessarily be present circumferentially on the entire contact surface. It is also possible for only sections of the contact surface to be provided with the curvature according to the invention, whereas other regions are formed conventionally. This can, for example, occur when the glass pane is strongly curved in the region of part of its side edge, whereas it has no really strong curvature in the region of the rest of the side edge. In that case, it can be advantageous to provide only the regions of the contact surface that are associated with the strongly curved side edges with the curvature according to the invention.

The extent of the required curvature of the contact surface depends substantially on the geometry of the glass pane to be bent and can be determined by conventional technical calculations during planning of the bending tool. The curvature is, in particular, selected such that the lower pane surface does not touch the contact surface, even in the final bent state. The curvature is selected such that the lower pane surface does not touch the contact surface even in the final bent state. The lower pane surface and the contact surface should thus always enclose an angle greater than 0°, referred to in the context of the invention as a "clearance angle". Due to the pane curvature, the respective tangential plane on the contact line must be used for the exact determination of the clearance angle. The clearance angle between the glass pane and the contact surface at the pressing line is preferably at least 3°, particularly preferably at least 5°, for example, from 5° to 8°. Thus, the pane surface and the contact surface are spaced sufficiently apart to effectively rule out direct contact, even under consideration of production tolerances.

The radius of curvature of the contact surface between the first contact line and the pressing line should advantageously be 750 mm at most, preferably 500 mm at most. With these values, with customary radii of curvature of the glass pane to be bent, good results are achieved and an adequate clearance angle is ensured.

In an advantageous development, the radius of curvature increases, at least in sections, in the direction from the first contact line to the pressing line—the curvature thus becomes weaker from the outside toward the inside. In the cross-section from the first contact line to the pressing line, there thus exists at least one section of the contact surface in which the curvature becomes stronger from the outside toward the inside. As a result, the inner edge of the contact surface is lowered farther and the risk of contact between the pane surface and the contact surface is further reduced. It is most particularly advantageous for the radius of curvature to increase from the outside toward the inside in the entire region between the first contact line and the pressing line.

In a preferred embodiment, the distance between the first contact line and the pressing line is from 2 cm to 50 cm, preferably from 5 cm to 30 cm. Said distance is measured along the shortest connection on the contact surface between the first contact line and the pressing line, in particular substantially perpendicular to the two lines. Particularly good bending results can be obtained with the distances indicated.

The distance between the pressing line and the inner edge of the contact surface is preferably at least 10 mm, for example; from 10 mm to 100 mm. The distance between the first contact line and the outer edge of the contact surface is preferably at least 5 mm, for example, from 5 mm to 100 mm.

The upper press-bending mould is, in an advantageous embodiment, implemented as a so-called "solid mould", i.e., has a full-surface downward-facing contact surface or active surface. In contrast to a frame bending mould, such an active surface, which can also be referred to as "solid", makes contact, at the end of the bending step, with most of the upper pane surface—or even the entire upper pane surface. A solid upper press-bending mould is particularly suitable for press bending in connection with a frame-like lower press-bending mould. The active surface of the upper press-bending mould is, in particular, convex and has a geometry that corresponds to that of the final bent pane.

In the case of press bending, the contact surfaces of the two press-bending moulds are typically not covered with a fabric, in particular a metal-containing fabric, as is customary with other bending moulds. Instead, the glass pane is in direct contact with the metal surfaces of the bending moulds.

The device according to the invention also includes means for moving the lower and the upper press-bending mould toward each other. By this means, the two press-bending moulds are moved closer to one another, after the glass pane has been positioned for bending, such that they can act together pressing on the glass pane. Vertical movement of the lower press-bending mould, the upper press-bending mould, or both can be used to bring them closer to one another.

The device according to the invention also includes means for heating the glass pane to softening temperature. Typically, the bending moulds are arranged inside a heatable bending furnace or a heatable bending chamber. The glass pane can pass through a separate chamber for heating, for example, a tunnel furnace.

The device also includes means for moving the glass pane to be bent, in order to transport the glass pane to the heating means and away from the heating means again after bending. Thus, for example, the press-bending moulds can be movably mounted, for instance, on a transport rack that is moved by means of rollers or conveyor belts. Alternatively, the bending moulds can be arranged stationarily in the bending furnace and the glass pane can be moved directly on rollers or conveyor belts. In the bending furnace, the glass pane can, for example, be picked up from the upper press-bending mould. For this purpose, the glass pane can be moved from the upper press-bending mould by suction or blown onto the upper press-bending mould by a vertical stream of air.

In an advantageous embodiment, the glass pane is pre-bent before the press bending, and the device is equipped with corresponding means for producing the pre-bend. The pre-bending can be done, for example, by blowing the softened glass pane onto the upper press-bending mould. Alternatively, the pre-bending can be produced by gravity bending. For this purpose, the device is equipped with a gravity bending mould, which preferably has a frame-shaped support surface delimited by an inner edge and an outer edge. Only one edge region of the glass pane is in direct contact with the support surface, whereas most of the glass pane has no direct contact with the gravity bending mould. The circumferential side edge of the glass pane can be arranged on the support surface or even protrude beyond the support surface in sections or circumferentially. When the glass pane is heated to softening temperature, the center of the pane drops under the action of gravity and the pane edges are raised relative to the center of the pane, producing the pre-bend. Through the combination of gravity bending for producing a pre-bend and press bending for the final bend, glass panes with complex geometries can be produced in high optical quality.

The device then preferably includes means for arranging the glass pane on the gravity bending mould, in particular an upper transport mould with a downward-oriented contact surface. The glass pane is sucked or blown onto the contact surface. The gravity bending mould is moved under the transport mould (or, alternatively, the transport mould, is moved over the gravity bending mould), optionally, brought closer to the transport mould, and the glass pane is placed on the support surface of the gravity bending mould by switching off the suction or blowing action. The contact surface der transport mould is preferably planar, as a result of which the glass pane, planar in the initial state, can be optimally transported.

The device can, for example, specifically include means for moving the glass pane from the gravity bending mould to the lower press-bending mould, for example, a further upper transport mould. It can also be lifted from the gravity bending mould by blowing it against the upper press-bending mould, with the gravity bending mould subsequently being exchanged for the lower press-bending mould in order to prepare the device for press bending. In an advantageous embodiment, the gravity bending mould and the lower press-bending mould are combined in a common tool, wherein the contact surface of the lower press-bending mould frames the support surface of the gravity bending mould or vice versa. The contact surface of the lower press-bending mould and the support surface of the gravity bending mould are movable relative to one another by vertical displacement such that a change can be made between a first state, in which the support surface of the gravity bending mould is arranged higher than the contact surface of the lower press-bending mould, and a second state, in which the contact surface of the lower press-bending mould is arranged higher than the support surface of the gravity bending mould. When the glass pane has been pre-bent in the first state on the gravity bending mould, it can be transferred onto the lower press-bending mould in a simple manner by transition into the second state without having to be lifted by a tool.

The gravity bending mould preferably has a frame-shaped support surface that is suitable for arranging a glass pane thereon and that has an outer edge and an inner edge. The inner edge faces the center and, in the intended use, faces the center of the glass pane. The outer edge points outward and, in the intended use, faces the pane edge and faces away from the center of the glass pane. The circumferential side edge of the glass pane can be arranged on the support surface or even protrude beyond the support surface in sections or circumferentially.

In a particularly preferred development, the support surface is not completely planar, but is partially curved. The support surface has an outer, a central, and an inner region. The regions are also implemented frame-like, with the outer region surrounding the central region, which, in turn, surrounds the inner region. The outer region faces the outer edge; the inner region faces the inner edge; and the central region is arranged between the outer region and the inner region. In a cross-section through the gravity bending mould, the regions are discernible between the outer edge and the inner edge of the support surface, with, arranged starting from the outer edge in the direction of the inner edge, first the outer region, then the central region, and then the inner region.

The outer region of the support surface is planar and arranged horizontally. The central region can be planar or slightly curved (preferably convexly) and is inclined inward, i.e., toward the inner edge. The inner region has, in contrast, relatively strong curvature, in the direction opposite the curvature of the glass pane produced during the gravity bending operation. Since the center of the pane drops under the action of gravity and the pane edges are lifted relative to the center of the pane, the glass pane is bent during gravity bending such that the lower pane surface is convexly curved and the upper pane surface is concavely curved. The inner region of the support surface according to the invention is, consequently, convexly curved such that the curvature of the second region and the curvature of the glass pane are in the direction opposite one another. This shaping of the support surface prevents the glass pane from resting only on the edges of the support surface. Instead, the glass pane initially rests flat on the outer region; and after the onset of bending, flat on the central region. The risk of creation of bothersome mould markings can thus be effectively avoided. The glass pane also does not come into contact with the inner edge, which is ensured by the strongly curved inner region. Mould markings can, in turn, be avoided due to lack of contact between the inner edge and the glass pane.

The inner region is more strongly curved than the central region, i.e., has a smaller radius of curvature. The curvature of the inner region is, in particular, selected such that in the final bent state, the glass pane does not touch the inner edge.

In a preferred embodiment, the radius of curvature in the inner region is at most 200 mm, particularly preferably from 20 mm to 100 mm. The radius of curvature in the central region is preferably at least 200 mm, particularly preferably at least 400 mm. Under these conditions, particularly good results are obtained with customary pane bends.

The support surface preferably has a width from 3 cm to 20 cm, particularly preferably from 5 cm to 15 cm. Such widths are customary for the support surface of gravity bending moulds. The term "width" refers to the dimension of the support surface along the shortest connection between the outer edge and the inner edge, in particular substantially perpendicular to the two edges. The width of the central region is preferably at least 50% of the width of the support surface, particularly preferably at least 70%, most particularly preferably from 80% to 90%. The width of the planar outer region of the support surface should be at least 5 mm, preferably from 5 mm to 20 mm. The width of the curved inner region of the support surface should be at least 2 mm, preferably from 2 mm to 10 mm.

The support surface of the gravity bending mould can be covered with a fabric, in particular a metal-containing fabric. This serves, on the one hand, for padding in order to further reduce the risk of mould markings and, on the other, for thermal insulation in order to reduce cooling of the glass pane by the gravity bending mould.

The invention also includes an arrangement for bending glass panes, comprising the device according to the invention and a glass pane that is positioned between the lower press-bending mould and the upper press-bending mould.

After press bending, the glass pane is cooled, which can be done in any manner desired. The cooling can be done on another mould, onto which the pane is transferred. The cooling can be done at ambient temperature or by active cooling. The gravity bending mould according to the invention and the method are particularly suitable for producing bent, prestressed glass panes, as are common, for example, as side windows or rear windows of motor vehicles. Consequently, in a preferred embodiment, the glass pane is thermally prestressed after bending by rapid cooling. For this purpose, the glass pane is transferred after bending to a so-called "tempering frame", on which it is stored during the prestressing operation.

The glass pane to be bent preferably contains soda lime glass, as is customary for window panes, but can, however, also contain other types of glass, such as borosilicate glass or quartz glass. The thickness of the glass pane is typically from 0.5 mm to 10 mm, preferably 1 mm to 5 mm. Typical temperatures for bending glass panes are from 500 CC to 700° C., in particular approx. 650° C. with the bending of panes made of soda lime glass.

The invention also includes the use of a device according to the invention for press bending glass panes for means of transportation for travel on land, in the air, or on water, preferably for press bending of window panes of rail vehicles or motor vehicles, in particular for press bending of rear windows, side windows, or roof panels of passenger cars. The glass panes bent with the method according to the invention are preferably used for means of transportation for travel on land, in the air, or on water, particularly preferably as window panes of rail vehicles or motor vehicles, in particular as rear windows, side windows, or roof panels of passenger cars.

In the following, the invention is explained in detail with reference to drawings and exemplary embodiments. The drawings are schematic representations and are not to scale. The drawings in no way restrict the invention.

Figure 4:
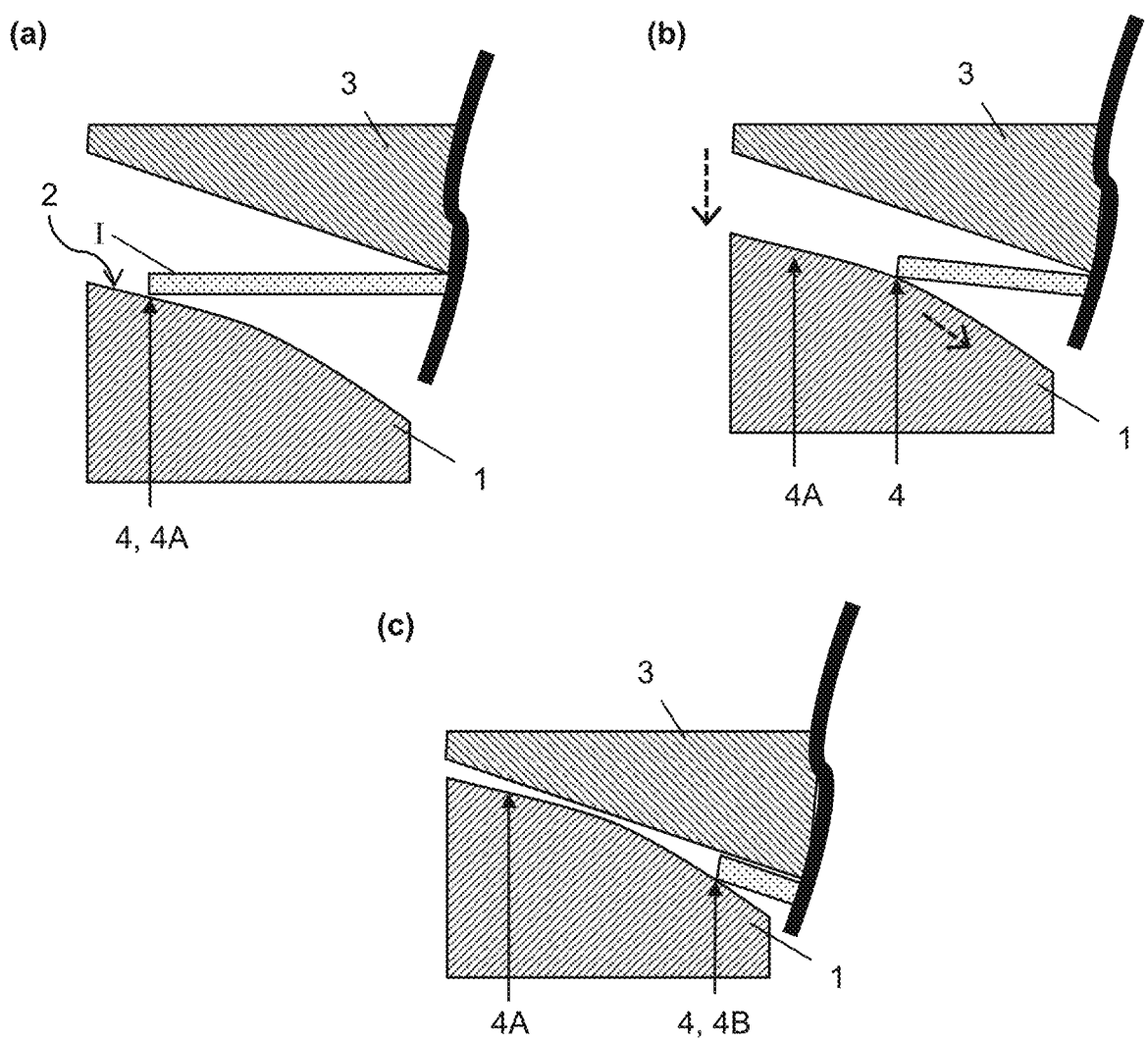
Figure 7:
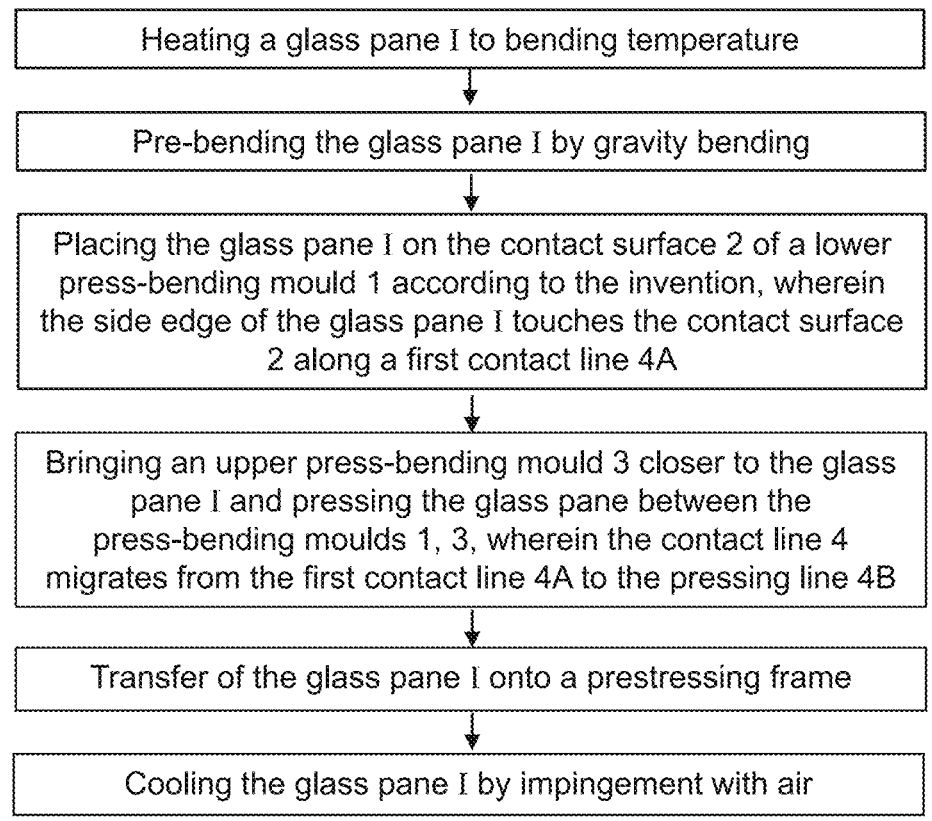

They depict;

FIG. 1 a cross-section through a generic device during press bending of a glass pane, FIG. 2 a cross-section through a section of a prior art device during press bending, FIG. 3 a plan view of the contact surface of the lower press-bending mould of a generic device, FIG. 4 a cross-section through a section of a device according to the invention during press bending, FIG. 5 a cross-section through a section of a lower press-bending mould according to the invention with a final bent glass pane, FIG. 6 a cross-section of a tool, in which the lower press-bending mould is combined with a gravity bending mould, and FIG. 7 a flowchart of an embodiment of the method according to the invention.

FIG. 1 depicts a cross-section through a generic device for press bending of glass panes. The device comprises a lower press-bending mould 1 with a frame-like contact surface 2 and an upper press-bending mould 3 with a full-surface active surface, which are arranged opposite one another and are vertically movable relative to one another. The glass pane I to be bent is arranged between the press-bending moulds 1, 3. The press-bending moulds 1, 3 are brought closer to one another such that the glass pane I is pressed therebetween and reshaped thereby. Only the side edge S of the glass pane I rests on the contact surface 2 of the lower press-bending mould 1. The glass pane I and the contact surface 2 thus touch one another only along a circumferential line that is referred to as a contact line 4. The entire upper pane surface O is in contact with the active surface of the upper press-bending mould 3. The shape of the active surface of the upper press-bending mould 3 corresponds to the desired bent shape of the glass pane I.

FIG. 2 depicts a cross-section through a section of a device whose lower press-bending mould 1 is implemented conventionally. The contact surface 2 is planar and inclined inward. First, the glass pane I is brought into contact with the lower press-bending mould 1 and the upper press-bending mould 3 (FIG. 2a). That contact line 4, along which the glass pane I initially comes into contact with the contact surface 2, is referred to as the first contact line 4A. The glass pane I is, for the sake of simplicity, shown planar here in the initial state; however, it can also be pre-bent. For press-bending, the press-bending moulds 1, 3 are brought closer to one another such that the glass pane I is reshaped. The contact line 4 migrates inward, starting from the first contact line 4A (FIG. 2b). The dashed arrows indicate the movement of the upper press-bending mould 3 and the contact line 4 during press bending. At the end of the press bending, the press-bending moulds 1, 3 have reached their final position and the glass pane I is bent into its final shape (FIG. 2c). The contact line 4 reaches its most inward position, which is referred to as the pressing line 4B.

The figure illustrates the disadvantage of conventional lower press-bending moulds with a planar contact surface 2. In particular, in the production of glass panes I with strong curvatures in the edge region, there is a risk of the lower pane surface U making contact with the contact surface 2 in the region between the pressing line 4B and the inner edge, possibly with resultant negative impact on optical quality. The contact could, in principle, be prevented by orienting the contact surface 2 more steeply. In order for the contact line 4 to nevertheless cover the same horizontal distance, it would then be necessary to significantly lengthen the contact surface 2, with the result that the lower bending mould would have to be very extensive, in particular, unmanageably tall, and could be integrated into existing plants only with difficulty.

FIG. 3 depicts a plan view of a lower press-bending mould 1. Discernible is the frame-shaped contact surface 2, which is delimited by an inner edge 6 facing the center and an outer edge 7 facing outward. The contact of the contact surface 2 with the side edge S of the glass pane I is made within a region between the frame-shaped first contact line 4A and the pressing line 4B, both of which are arranged circumferentially on the contact surface 2.

FIG. 4 depicts, for comparison with FIG. 2, a cross-section through a section of a device with a lower press-bending mould 1 according to the invention. The contact surface 2 is convexly curved, in particular in the region between the first contact line 4A and the pressing line 4B. The curvature of the contact surface 2 is direction opposite the curvature of the pane. The bending increases the distance of the lower region of the contact surface 2 from the glass pane I, as a result of which making contact with the lower pane surface U can be avoided, even in the case of glass panes with strong curvatures in the edge region.

FIG. 5 depicts a cross-section of another lower press-bending mould 1. The design according to the invention of the contact surface 2 (delimited by the inner edge 6 and the outer edge 7) ensures that the lower pane surface does not come into contact with the contact surface 2. The lower pane surface and the contact surface 2 thus always enclose an angle greater than 0°, which is referred to as a clearance angle $\alpha$. Depending on the curvatures of the glass pane I and the contact surface 2, the clearance angle $\alpha$ can change during press bending, but always remains greater than 0°. The clearance angle at the pressing line 4B should advantageously be greater than 3°, for example, 7°.

The clearance angle between the curved surfaces can be determined exactly by using the tangential planes at the respective contact line 4.

FIG. 6 schematically depicts a lower press-bending mould 1 and a gravity bending mould 5 that are combined in a common tool. The gravity bending mould 5 has a frame-shaped support surface that is framed by the contact surface 2 of the lower press-bending mould 1. The press-bending mould 1 and the gravity bending mould 5 are vertically displaceable relative to one another such that it is possible to adjust whether the support surface of the gravity bending mould 5 or the contact surface 2 of the press-bending mould 1 is arranged higher and, consequently, can support the glass pane I. First, the glass pane I is pre-bent on the gravity bending mould 5 that is arranged higher (FIG. 6a). The bending moulds 1, 5 are subsequently displaced relative to one another, with the glass pane I being transferred from the gravity bending mould 5 to the lower press-bending mould 1 (FIG. 6b). The transfer can be done by moving the gravity bending mould 5 downward, by moving the press-bending mould 1 upward, or by a combination of both.

FIG. 7 depicts an exemplary embodiment of the method according to the invention with reference to a flowchart.

LIST OF REFERENCE CHARACTERS (1) lower press-bending mould
(2) contact surface of the lower bending mould 1
(3) upper press-bending mould
(4) contact line between the glass pane I and the contact surface 2
(4A) first contact line
(4B) pressing line
(5) gravity bending mould
(6) inner edge of the contact surface 2
(7) outer edge of the contact surface 2
$\alpha$ clearance angle between the contact surface 2 and the glass pane I
(I) glass pane
(O) upper pane surface of the glass pane I
(U) lower pane surface of the glass pane I
(S) side edge of the glass pane I

The invention claimed is:

1. Device for bending glass panes, comprising
a lower press-bending mould with a frame-shaped contact surface,
an upper press-bending mould arranged opposite the contact surface,
wherein the lower press-bending mould and the upper press-bending mould are suitable for reshaping a glass pane situated therebetween by pressing, wherein a side edge of the glass pane rests on the contact surface along a contact line,
wherein during pressing, the contact line migrates from a first contact line all the way to a pressing line, wherein the contact surface between the first contact line and the pressing line is convexly curved, and wherein a curvature of the contact surface between the first contact line and the pressing line is selected to prevent direct contact between the contact surface and a lower surface of the glass pane during said pressing when the contact line migrates from the first contact line all the way to the pressing line.

2. The device according to claim 1, wherein a clearance angle between the contact surface and the glass pane at the pressing line is at least 3°.

3. The device according to claim 2, wherein the clearance angle is at least 5°.

4. The device according to claim 1, wherein a radius of curvature of the curved contact surface is at most 750 mm.

5. The device according to claim 4, wherein the radius of curvature of the curved contact surface is at most 500 mm.

6. The device according to claim 1, wherein a radius of curvature of the curved contact surface increases, at least in sections, in a direction from the first contact line to the pressing line.

7. The device according to claim 1, wherein the contact surface of the lower press-bending mould and a contact surface of the upper press-bending mould are not covered with a fabric.

8. The device according to claim 1, wherein a distance between the first contact line and the pressing line is from 2 cm to 50 cm.

9. The device according to claim 8, wherein the distance between the first contact line and the pressing line is from 5 cm to 30 cm.

10. The device according to claim 1, wherein the upper press-bending mould has a full-surface active surface.

11. The device according to claim 1, comprising a gravity bending mould with a frame-shaped support surface and which is suitable for transferring the glass pane from the gravity bending mould to the lower press-bending mould by vertical displacement of the gravity bending mould and the lower press-bending mould relative to one another.

12. The device according to claim 11, wherein the support surface of the gravity bending mould has a planar and horizontal outer region, an inclined, planar, or curved central region, and a convexly curved inner region, wherein the inner region is more strongly curved than the central region.

13. Method for bending glass panes, comprising:
(a) arranging a glass pane heated to at least its softening temperature between a lower press-bending mould with a frame-shaped contact surface and an upper press-bending mould and establishing contact between a side edge of the glass pane and the contact surface along a first contact line,
(b) press bending the glass pane between the lower press-bending mould and the upper press-bending mould, wherein the side edge of the glass pane rests on the contact surface along a contact line, which migrates during pressing from the first contact line all the way to a pressing line, wherein the contact surface is convexly curved between the first contact line and the pressing line, and wherein a curvature of the contact surface between the first contact line and the pressing line is selected to prevent direct contact between the contact surface and a lower surface of the glass pane during said pressing when the contact line migrates from the first contact line all the way to the pressing line.

14. The method according to claim 13, wherein a clearance angle between the contact surface and the glass pane at the pressing line is at least 3°.

15. The method according to claim 14, wherein the clearance angle is at least 5°.

16. The method according to claim 13, wherein the glass pane is pre-bent before step (a).

17. The method according to claim 16, wherein the glass pane is pre-bent on a gravity bending mould and subsequently transferred to the lower press-bending mould by a vertical displacement of the gravity bending mould and the lower press-bending mould relative to each other.

18. The method according to claim 13, wherein the glass pane is thermally prestressed after step (b).

19. A method comprising utilizing a device according to claim 1 for bending glass panes for means of transportation for travel on land, in the air, or on water.

20. The method according to claim 19, wherein the glass panes are window panes of rail vehicles or motor vehicles.

* * * * *